(12) United States Patent
Tsurumi et al.

(10) Patent No.: US 12,194,821 B2
(45) Date of Patent: Jan. 14, 2025

(54) VEHICLE HALF DOOR, VEHICLE FULL DOOR, AND VEHICLE DOOR GROUP

(71) Applicant: Kawasaki Motors, Ltd., Hyogo (JP)

(72) Inventors: Sota Tsurumi, Akashi (JP); Teruaki Yamamoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 274 days.

(21) Appl. No.: 17/846,042

(22) Filed: Jun. 22, 2022

(65) Prior Publication Data
US 2023/0415551 A1 Dec. 28, 2023

(51) Int. Cl.
*B60J 5/04* (2006.01)
(52) U.S. Cl.
CPC ........... *B60J 5/0487* (2013.01); *B60J 5/0406* (2013.01); *B60J 5/0463* (2013.01)
(58) Field of Classification Search
CPC ................................ B60J 5/0487; B60J 1/085
See application file for complete search history.

(56) References Cited

U.S. PATENT DOCUMENTS

| | | | | |
|---|---|---|---|---|
| 6,036,255 | A * | 3/2000 | Lester | B60J 5/0487 49/502 |
| 6,988,759 | B2 * | 1/2006 | Fin | B60J 5/0487 296/146.7 |
| 7,216,926 | B2 * | 5/2007 | Hampel | B62D 33/0617 296/190.08 |
| 7,410,202 | B2 * | 8/2008 | Rose | B60R 16/005 296/146.16 |
| 10,272,747 | B2 * | 4/2019 | Nania | B60J 5/0408 |
| 10,363,798 | B2 * | 7/2019 | Kleinhoffer | B60J 5/0468 |
| 10,400,498 | B2 * | 9/2019 | Ikeda | B60J 1/17 |
| 10,836,241 | B2 * | 11/2020 | Spitsnogle | B60J 5/0415 |
| 10,974,573 | B2 * | 4/2021 | Cotnoir | B60J 5/0406 |
| 11,607,931 | B2 * | 3/2023 | Prekop | B60J 5/0476 |
| 11,639,088 | B2 * | 5/2023 | Schultz | B60J 5/0486 296/146.7 |
| 11,827,082 | B2 * | 11/2023 | Yamamoto | B60R 13/0243 |
| 11,912,113 | B2 * | 2/2024 | Yamamoto | B60J 5/047 |
| 2020/0290441 | A1 | 9/2020 | Spitsnogle | |
| 2022/0111708 | A1 * | 4/2022 | Krapfl | B60J 5/0463 |
| 2023/0065651 | A1 * | 3/2023 | Getzschman | B60J 5/0443 |
| 2024/0010056 | A1 * | 1/2024 | Skorka | B60J 5/0481 |

* cited by examiner

*Primary Examiner* — Jason S Morrow
(74) *Attorney, Agent, or Firm* — XSENSUS LLP (57) ABSTRACT

A vehicle full door includes a door body having a first door panel and a second door panel formed separately from the first door panel and connected to an upper end of the first door panel; a window provided at the second door panel; an outer knob, an inner knob, and a latch provided at the first door panel; and a hinge provided at the first door panel to turnably support the door body.

10 Claims, 8 Drawing Sheets

VEHICLE HALF DOOR, VEHICLE FULL DOOR, AND VEHICLE DOOR GROUP

FIELD

The technique disclosed herein relates to a vehicle half door, a vehicle full door, and a vehicle door group.

BACKGROUND

Typically, a full door that opens or closes the entirety of an entrance and a half door that opens or closes part of the entrance have been known as vehicle doors. For example, U.S. Patent Application Publication No. 2020/0290441 discloses the technique of using a door frame for both a full door and a half door. At the frame of U.S. Patent Application Publication No. 2020/0290441, an upper portion corresponding to a window portion is detachable. Such an upper portion is detached or attached so that the frame can be used for both the full door and the half door. Thus, the common door frame can be used.

SUMMARY

However, the above-described vehicle door is insufficient in terms of use of a common door component between the full door and the half door.

The technique disclosed herein has been made in view of the above-described points, and an object thereof is to use a common door component between a full door and a half door.

A vehicle half door disclosed herein includes a door body, a cover, a door knob and a latch, and a hinge. The door body has a first door panel. The cover closes an upper opening of the first door panel. The door knob and the latch are provided at the first door panel. The hinge is provided at the first door panel to turnably support the door body.

A vehicle full door disclosed herein includes a door body, a window, a door knob and a latch, and a hinge. The door body has a frame, a first door panel attached to the frame, and a second door panel formed separately from the first door panel and attached to the frame with connected to an upper end of the first door panel. The window is provided at the second door panel so as to move up and down. The door knob and the latch are provided at the first door panel. The hinge is provided at the first door panel to turnably support the door body.

A vehicle door group disclosed herein has a vehicle full door that opens or closes the entirety of an entrance of a vehicle and a vehicle half door that opens or closes part of the entrance of the vehicle. The vehicle half door includes a door body, a cover, a door knob and a latch, and a hinge. The door body has a first door panel. The cover closes an upper opening of the first door panel. The door knob and the latch are provided at the first door panel. The hinge is provided at the first door panel to turnably support the door body.

Another vehicle door group disclosed herein has a vehicle full door that opens or closes the entirety of an entrance of a vehicle and a vehicle half door that opens or closes part of the entrance of the vehicle. The vehicle full door includes a door body, a window, a door knob and a latch, and a hinge. The door body has a frame, a first door panel attached to the frame, and a second door panel formed separately from the first door panel and attached to the frame with connected to an upper end of the first door panel. The window is provided at the second door panel so as to move up and down. The door knob and the latch are provided at the first door panel. The hinge is provided at the first door panel to turnably support the door body.

Another vehicle door group disclosed herein has a vehicle full door that opens or closes the entirety of an entrance of a vehicle and a vehicle half door that opens or closes part of the entrance of the vehicle. Each of the vehicle full door and the vehicle half door includes a door body having a first door panel, a door knob and a latch provided at the first door panel, and a hinge provided at the first door panel to turnably support the door body.

DESCRIPTION OF EMBODIMENTS

Hereinafter, an exemplary embodiment will be described in detail based on the drawings.

Figure 1:
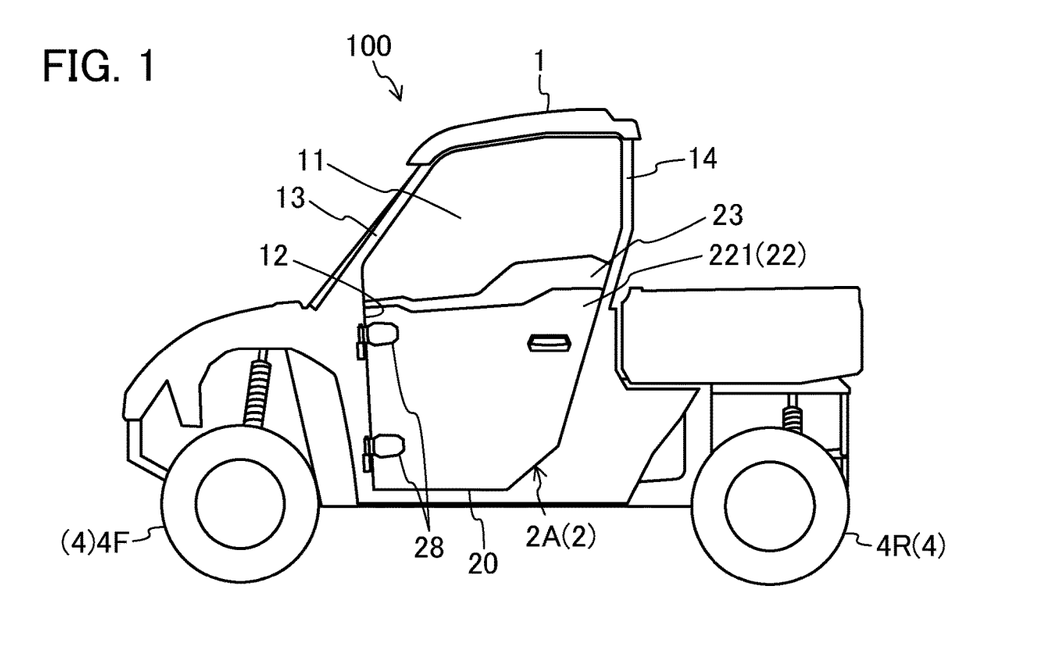
FIG. 1 is a left side view showing an outline configuration of a utility vehicle including half doors.
Figure 2:
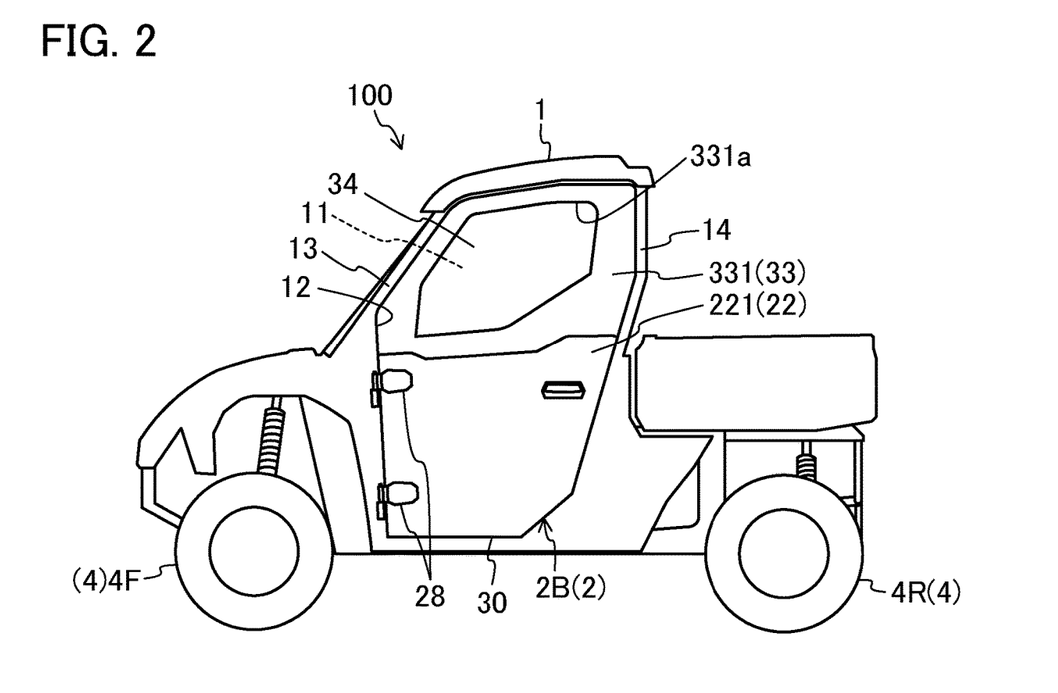
FIG. 2 is a left side view showing an outline configuration of a utility vehicle including full doors.

FIG. 1 is a left side view showing an outline configuration of a utility vehicle 100 including half doors 2A. FIG. 2 is a left side view showing an outline configuration of a utility vehicle 100 including full doors 2B.

The utility vehicle 100 is an automobile that can travel off road. The utility vehicle 100 is one example of a vehicle. The utility vehicle 100 includes a vehicle body 1 and wheels 4. The utility vehicle 100 of this example includes one including the half doors 2A as side doors as shown in FIG. 1 and one including the full doors 2B as side doors as shown in FIG. 2.

The full door 2B is a door that opens or closes the entirety of an entrance 12 of the utility vehicle 100, and the half door 2A is a door that opens or closes part of the entrance 12 of the utility vehicle 100. The half door 2A and the full door 2B form a vehicle door group 2. The half door 2A is one example of a vehicle half door, and the full door 2B is one example of a vehicle full door.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction that is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

In the vehicle body 1, a vehicle compartment 11 in which a driver seat and a passenger seat are provided is defined and formed. The entrance 12 causing the vehicle compartment 11 and the outside of the vehicle to communicate with each other is formed at a side portion of the vehicle body 1, i.e., a side portion of the utility vehicle 100. Although not shown in the figure in this example, the entrances 12 are formed at both right and left side portions of the vehicle body 1.

The vehicle body 1 has front pillars 13 and rear pillars 14. The front pillar 13 and the rear pillar 14 form part of an edge portion of the entrance 12. That is, the front pillar 13 defines and forms the front side of the entrance 12, and the rear pillar 14 defines and forms the rear side of the entrance 12.

The plurality of wheels 4 is provided, and supports the vehicle body 1. In this example, four wheels 4 are provided. That is, the wheels 4 include two front wheels 4F and two rear wheels 4R.

Figure 3:
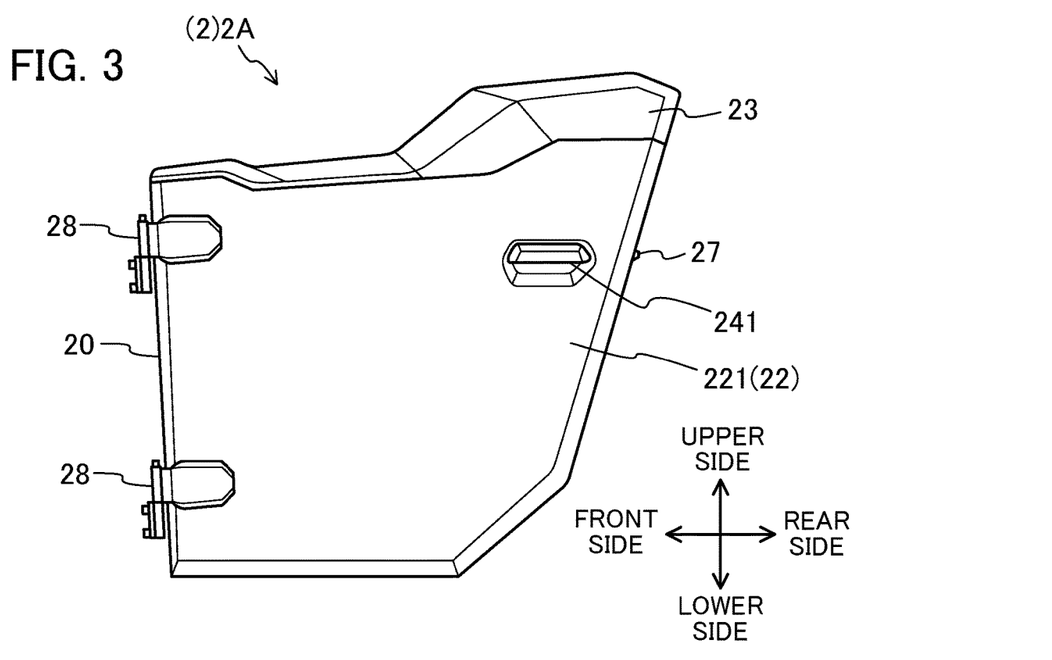
FIG. 3 is a side view showing the left half door from an outer side in a vehicle width direction.
Figure 4:
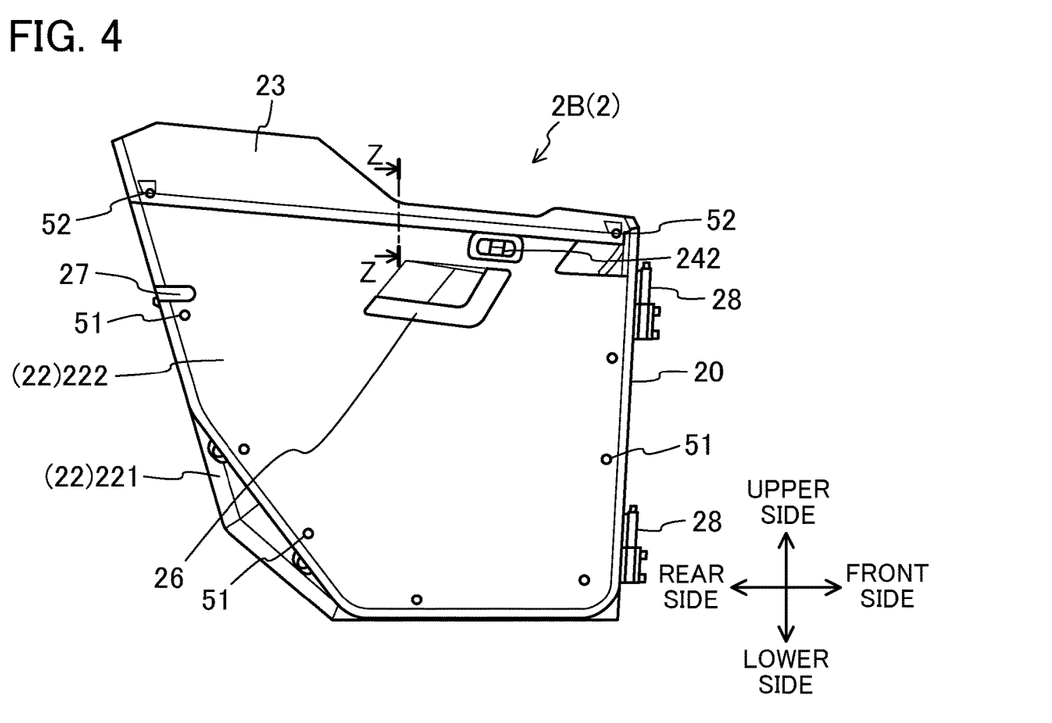
FIG. 4 is a side view showing the left half door from an inner side in the vehicle width direction.
Figure 5:
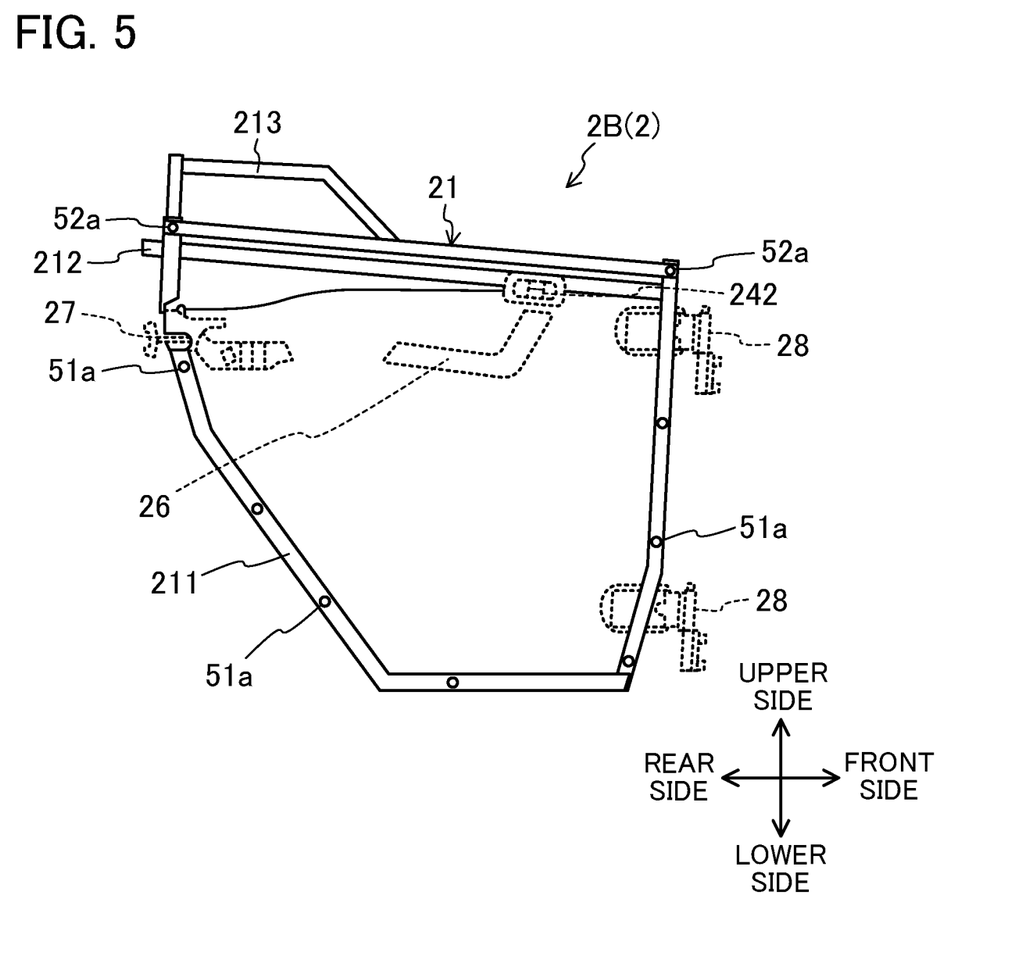
FIG. 5 is a view showing the left half door without a first door panel and corresponding to FIG. 4.

FIG. 3 is a side view showing the left half door 2A from the outer side in the vehicle width direction. FIG. 4 is a side view showing the left half door 2A from the inner side in the vehicle width direction. FIG. 5 is a view showing the left half door 2A without a first door panel 22 and corresponding to FIG. 4. The half door 2A is, as described above, for opening or closing part of the entrance 12, more specifically the substantially lower half of the entrance 12. In this example, two half doors 2A for the entrance 12 at the left side portion and the entrance 12 at the right side portion are provided.

The half door 2A includes a door body 20 and a cover 23.

The door body 20 has a frame 21 and the first door panel 22 attached to the frame 21. The first door panel 22 has a first outer panel 221 and a first inner panel 222 facing each other. The first outer panel 221 and the first inner panel 222 are stacked on each other, more specifically stacked on each other with the frame 21 interposed therebetween, thereby forming the door body 20. That is, the first outer panel 221 and the first inner panel 222 are arranged on both sides of the frame 21 in the vehicle width direction, and are attached to the frame 21. The frame 21 is made of metal. The first outer panel 221 and the first inner panel 222 are made of resin, and are produced by resin molding.

As shown in FIG. 5, the frame 21 has a frame body 211 and two reinforcements 212, 213. The frame body 211 is formed in a frame shape slightly smaller than the outer shapes of the first outer panel 221 and the first inner panel 222. That is, the frame body 211 is arranged along peripheral edge portions of the first outer panel 221 and the first inner panel 222. The reinforcement 212 is provided at an upper portion of the frame body 211, and is arranged so as to cross the frame body 211 substantially in the front-rear direction. The reinforcement 213 is connected to the rear side of the frame body 211 at an upper end thereof, thereby reinforcing the cover 23.

A plurality of holes 51a into which screws 51 are to be inserted are formed at the frame body 211. That is, the first outer panel 221, the frame body 211, and the first inner panel 222 are integrally fastened to each other with the screws 51. In this example, the screws 51 are inserted from a first inner panel 222 side.

The cover 23 closes an upper opening of the first door panel 22. A predetermined space is formed between the first outer panel 221 and the first inner panel 222 facing each other, and above such a space, the upper opening that opens in the up-down direction is formed. For avoiding easy entrance of water or dust through the upper opening and improving an appearance, the upper opening is closed with the cover 23. Specifically, the cover 23 is formed in a recessed shape opening downward. The cover 23 is, at a lower end thereof, connected to upper ends of the first outer panel 221 and the first inner panel 222, and in this manner, is attached to the upper opening of the first door panel 22.

The half door 2A further includes an outer knob 241, an inner knob 242, a door handle 26, a latch 27, and hinges 28. The outer knob 241, the inner knob 242, the door handle 26, the latch 27, and the hinges 28 are provided at the first door panel 22 of the door body 20.

The outer knob 241 is for rotation operation when an occupant outside the vehicle compartment 11 unlocks the half door 2A. As shown in FIG. 3, the outer knob 241 is provided at the first outer panel 221 of the first door panel 22. More specifically, the outer knob 241 is arranged slightly on the upper side at a rear end portion of the first outer panel 221. The outer knob 241 is one example of a door knob.

The inner knob 242 is for rotation operation when the occupant in the vehicle compartment 11 unlocks the half door 2A. As shown in FIG. 4, the inner knob 242 is provided at the first inner panel 222 of the first door panel 22. More specifically, the inner knob 242 is arranged slightly on the front side at an upper end portion of the first inner panel 222. That is, the inner knob 242 is one example of a door knob.

The door handle 26 is gripped by the occupant when the occupant opens or closes the door body 20. As shown in FIG. 4, the door handle 26 is provided at the first inner panel 222 of the first door panel 22. More specifically, the door handle 26 is arranged slightly on the upper side at the center of the first inner panel 222 in the front-rear direction. More specifically, the door handle 26 is arranged at a position below the inner knob 242.

Together with a not-shown striker provided at the vehicle body 1, the latch 27 unlocks or locks the half door 2A. As shown in FIG. 4, the latch 27 is provided at the first inner panel 222 of the first door panel 22. More specifically, the latch 27 is arranged slightly on the upper side at a rear end portion of the first inner panel 222.

The hinges 28 turnably support the door body 20. In this example, two hinges 28 are provided. The door body 20 turns in the front-rear direction about shafts of the hinges 28. Specifically, as shown in FIG. 3, the hinges 28 are attached to the first outer panel 221 of the first door panel 22. More specifically, two hinges 28 are provided at a front end portion of the first outer panel 221, and are spaced from each other in the up-down direction.

As described above, at the half door 2A, each of the outer knob 241, the inner knob 242, the door handle 26, the latch 27, and the hinges 28 is provided at the first door panel 22, i.e., one of the first outer panel 221 or the first inner panel 222.

Figure 6:
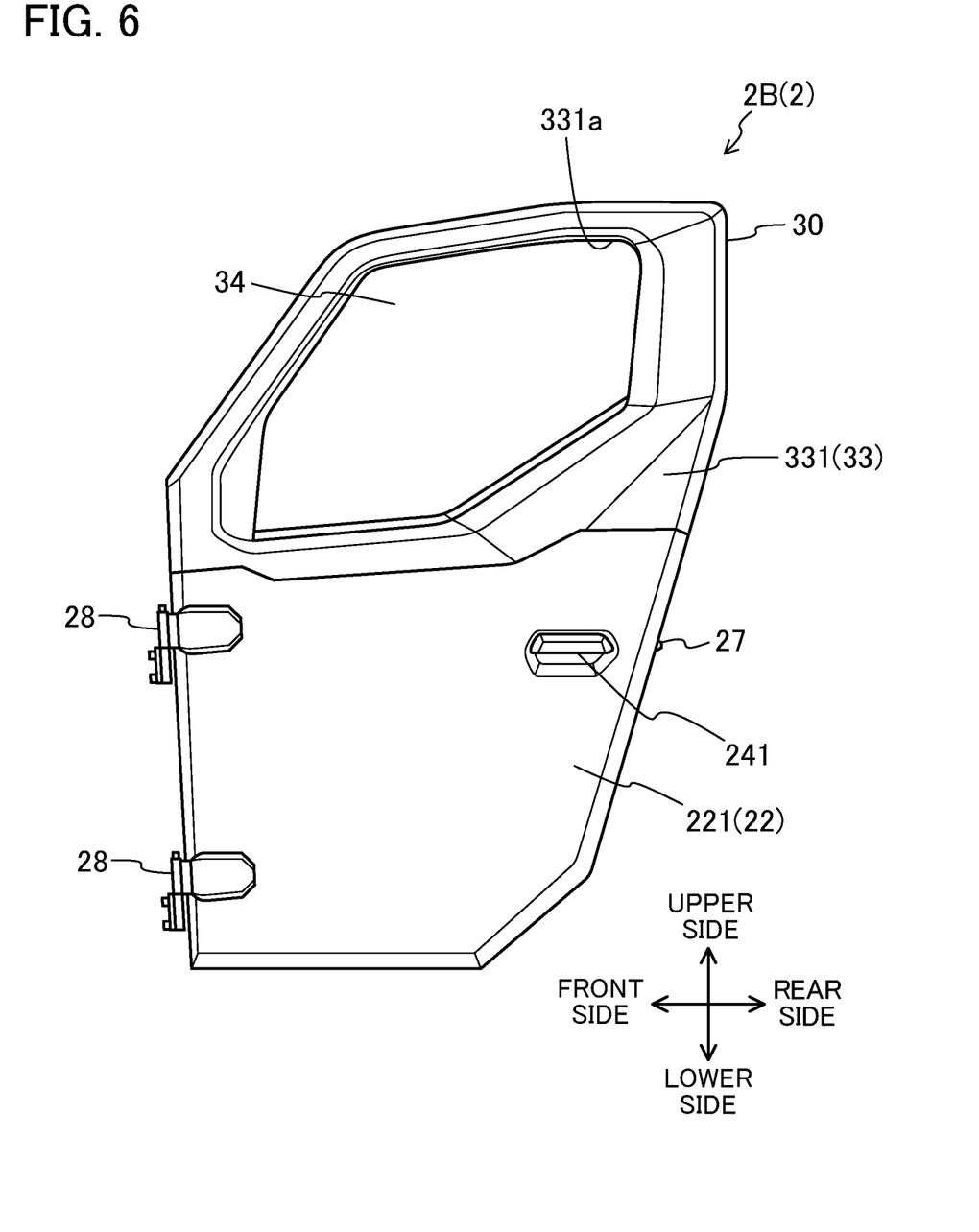
FIG. 6 is a side view showing the left full door from the outer side in the vehicle width direction.
Figure 7:
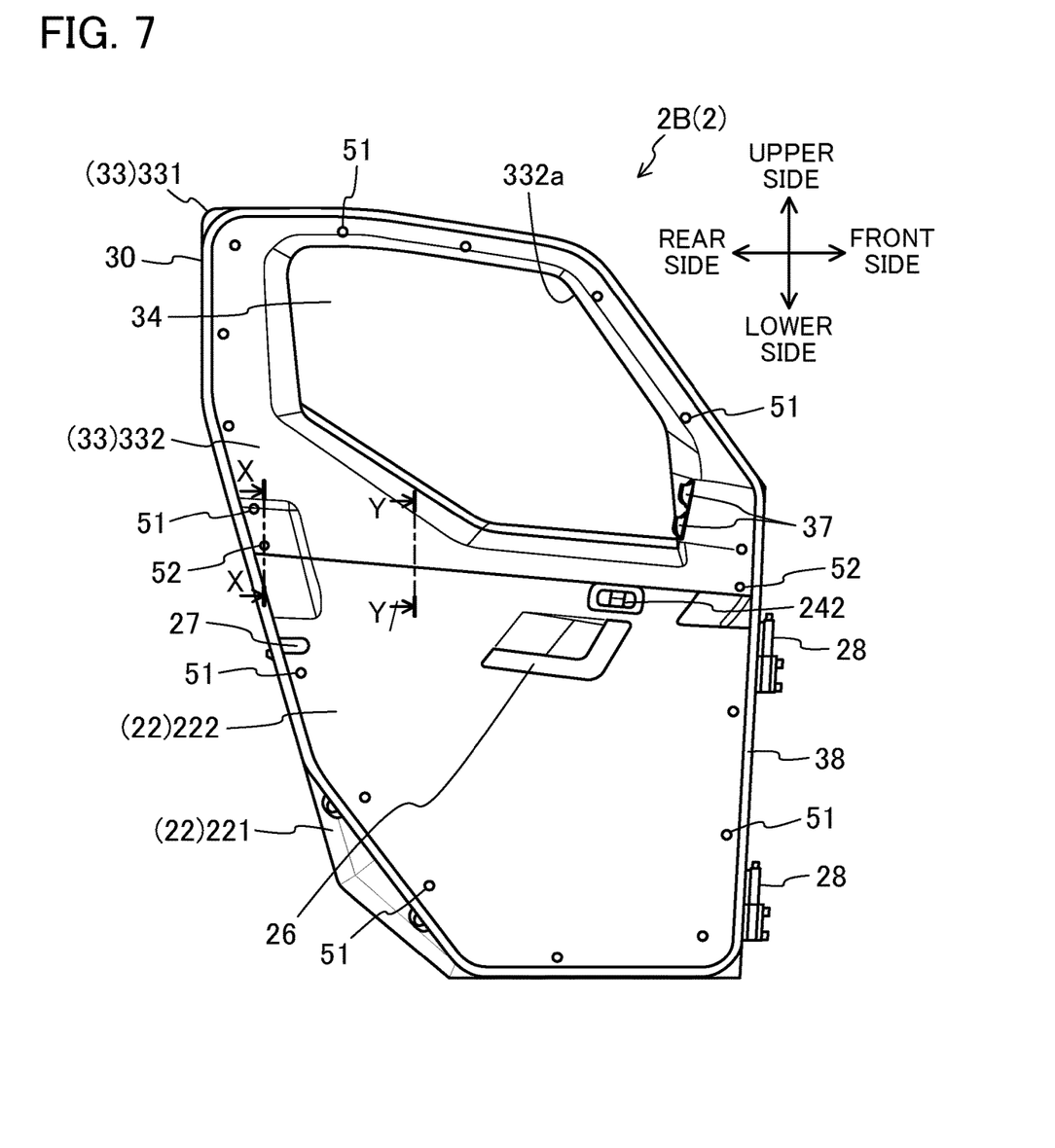
FIG. 7 is a side view showing the left full door from the inner side in the vehicle width direction.
Figure 8:
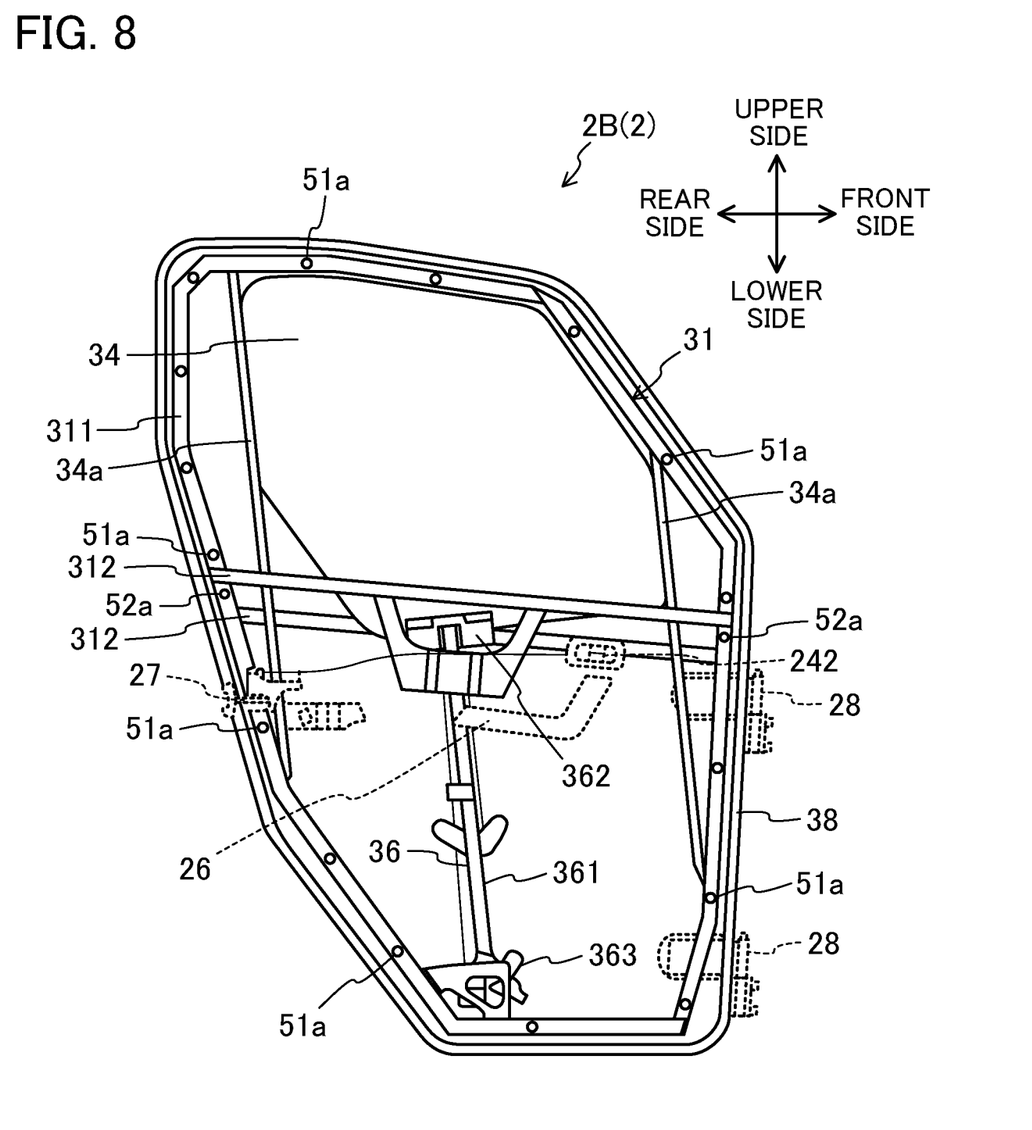
FIG. 8 is a view showing the left full door without a first door panel and a second door panel and corresponding to FIG. 7.

FIG. 6 is a side view showing the left full door 2B from the outer side in the vehicle width direction. FIG. 7 is a side view showing the left full door 2B from the inner side in the vehicle width direction. FIG. 8 is a view showing the left full door 2B without a first door panel 22 and a second door panel 33 and corresponding to FIG. 7. The full door 2B is, as described above, for opening or closing the entirety of the entrance 12. In this example, two full doors 2B for the entrance 12 at the left side portion and the entrance 12 at the right side portion are provided.

The full door 2B includes a door body 30, a window 34, and a waterproof seal 38.

The door body 30 has a frame 31 and the first door panel 22 and the second door panel 33 attached to the frame 31. As in the half door 2A, the first door panel 22 has a first outer panel 221 and a first inner panel 222 facing each other.

The second door panel 33 is formed separately from the first door panel 22, and is connected to an upper end of the first door panel 22. Specifically, the second door panel 33 has a second outer panel 331 and a second inner panel 332 facing each other. That is, the second outer panel 331 is formed separately from the first outer panel 221, and is connected to an upper end of the first outer panel 221. The second inner panel 332 is formed separately from the first inner panel 222, and is connected to an upper end of the first inner panel 222.

The first outer panel 221 and the first inner panel 222 are stacked on each other with the frame 31 interposed therebetween, and the second outer panel 331 and the second inner panel 332 are stacked on each other with the frame 31 interposed therebetween. That is, the first outer panel 221 and the second outer panel 331 are arranged on one side of the frame 31 in the vehicle width direction, and are attached to the frame 31. The first inner panel 222 and the second inner panel 332 are arranged on the opposite side of the frame 31 from the first outer panel 221 etc. in the vehicle width direction, and are attached to the frame 31. In this manner, the door body 30 is formed. The frame 31 is made of metal. The first outer panel 221, the first inner panel 222, the second outer panel 331, and the second inner panel 332 are made of resin, and are produced by resin molding.

As shown in FIG. 8, the frame 31 has a frame body 311 and two reinforcements 312. The frame body 311 is formed in a frame shape slightly smaller than the outer shape of the entirety of the first outer panel 221 and the second outer panel 331 connected to each other. Moreover, the frame body 311 is formed in a frame shape slightly smaller than the outer shape of the entirety of the first inner panel 222 and the second inner panel 332 connected to each other. That is, the frame body 311 is arranged along peripheral edge portions of the first outer panel 221 and the second outer panel 331 connected to each other, and is arranged along peripheral edge portions of the first inner panel 222 and the second inner panel 332 connected to each other.

Each of two reinforcements 312 is provided substantially at the center of the frame body 311 in the up-down direction. Each of two reinforcements 312 is arranged so as to cross the frame body 211 substantially in the front-rear direction.

As shown in FIG. 8, a plurality of holes 51*a* into which screws 51 are to be inserted is formed at the frame body 311. That is, the first outer panel 221, the frame body 311, and the first inner panel 222 are integrally fastened to each other with the screws 51, and the second outer panel 331, the frame body 311, and the second inner panel 332 are integrally fastened to each other with the screws 51. In this example, the screws 51 are inserted from a first inner panel 222 side and a second inner panel 332 side.

The window 34 is provided at the second door panel 33. Specifically, the window 34 is provided so as to move up and down between the second outer panel 331 and the second inner panel 332. Each of the second outer panel 331 and the second inner panel 332 is formed with a window opening 331*a*, 332*a*. The window 34 moves up and down, thereby opening or closing the window openings 331*a*, 332*a*. In this example, the window 34 is a so-called power window.

The waterproof seal 38 is provided at the first door panel 22 and the second door panel 33. Specifically, as shown in FIG. 7, the waterproof seal 38 is attached to the peripheral edge portions of the first inner panel 222 and the second inner panel 332 connected to each other. More specifically, the waterproof seal 38 is attached to peripheral portions of the first inner panel 222 and the second inner panel 332 on the outer peripheral side of the frame body 311.

As in the half door 2A, the full door 2B further includes an outer knob 241, an inner knob 242, a door handle 26, a latch 27, and hinges 28. As in the half door 2A, the outer knob 241, the inner knob 242, the door handle 26, the latch 27, and the hinges 28 are provided at the first door panel 22 of the door body 30.

The arrangement positions of the outer knob 241, the inner knob 242, etc. at the first door panel 22 are similar to those in the case of the half door 2A. That is, the outer knob 241 is, as shown in FIG. 6, provided at the first outer panel 221 of the first door panel 22. As shown in FIG. 7, the inner knob 242, the door handle 26, the latch 27, and the hinges 28 are provided at the first inner panel 222 of the first door panel 22.

As described above, each of the outer knob 241, the inner knob 242, the door handle 26, the latch 27, and the hinges 28 is, as in the half door 2A, also provided at the first door panel 22, i.e., one of the first outer panel 221 or the first inner panel 222, at the full door 2B.

The full door 2B further includes a window regulator 36 and an operation switch 37.

The window regulator 36 is for moving the window 34 up and down. As shown in FIG. 8, the window regulator 36 is attached to the frame 31 in the first door panel 22. That is, the window regulator 36 is arranged between the first outer panel 221 and the first inner panel 222, and is fixed to the frame body 311 and the reinforcements 312. The window regulator 36 is one example of a driver.

Specifically, the window regulator 36 has a guide rail 361, a carrier plate 362, and an actuator 363. The guide rail 361 extends in a direction in which the window 34 moves up and down, and is attached to the frame body 311 and the reinforcements 312. The carrier plate 362 is provided on the guide rail 361 so as to move along the guide rail 361. Moreover, the carrier plate 362 holds a lower end portion of the window 34. The actuator 363 moves the carrier plate 362 according to an operation signal from the operation switch 37. The actuator 363 is attached to the frame body 311 at a lower end of the guide rail 361. In this example, the actuator 363 is a motor. The window 34 moves up and down in association with movement of the carrier plate 362.

The operation switch 37 is a switch that drives the window regulator 36, i.e., moves the window 34 up and down. As shown in FIG. 7, the operation switch 37 is provided at the second door panel 33, more specifically the second inner panel 332. More specifically, the operation switch 37 is arranged at a front end portion of the second inner panel 332, much more specifically a portion of the second inner panel 332 on the front side of the window 34. With the window regulator 36, the occupant operates the operation switch 37 to move the carrier plate 362 by the actuator 363, thereby moving the window 34 up and down.

Figure 9:
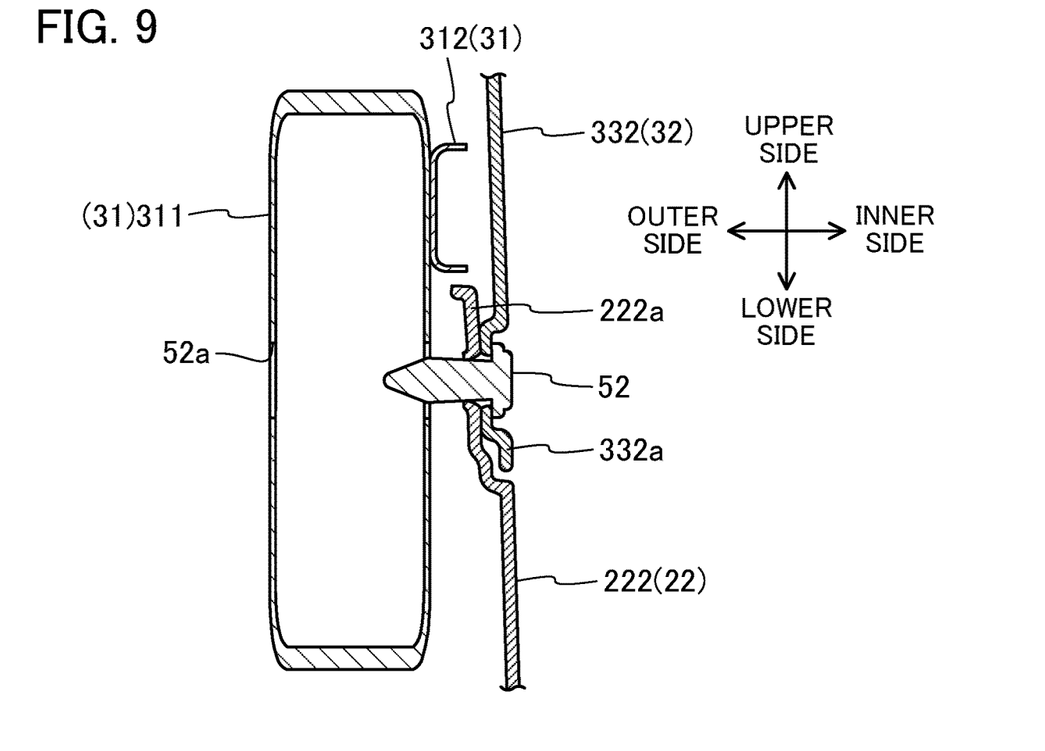
FIG. 9 is a sectional view along an X-X line of FIG. 7.
Figure 10:
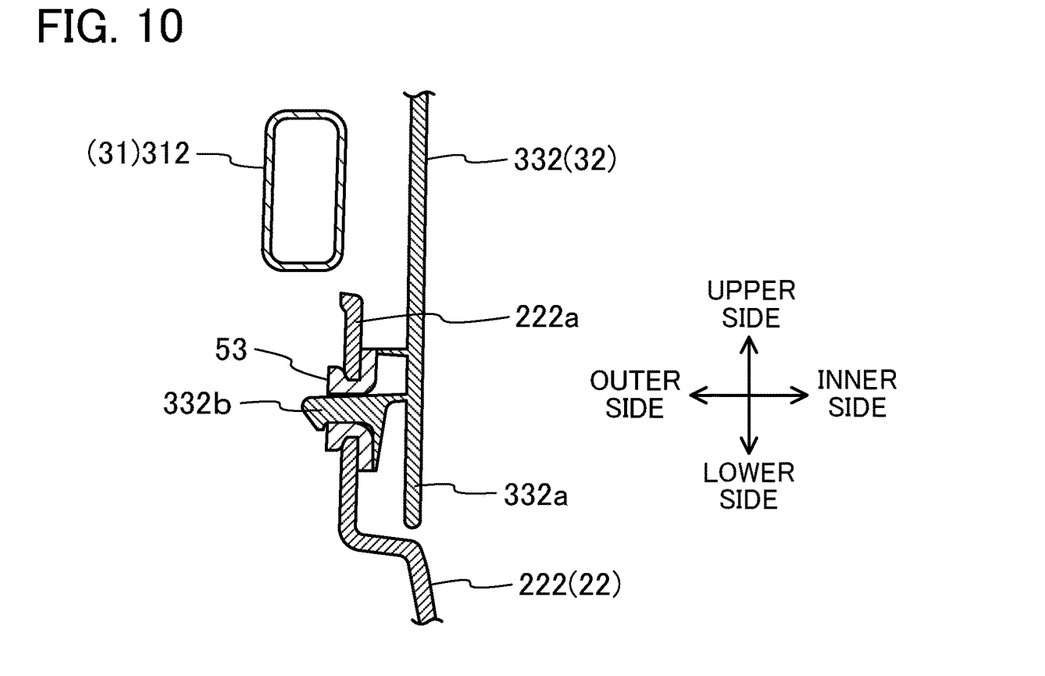
FIG. 10 is a sectional view along a Y-Y line of FIG. 7.
Figure 11:
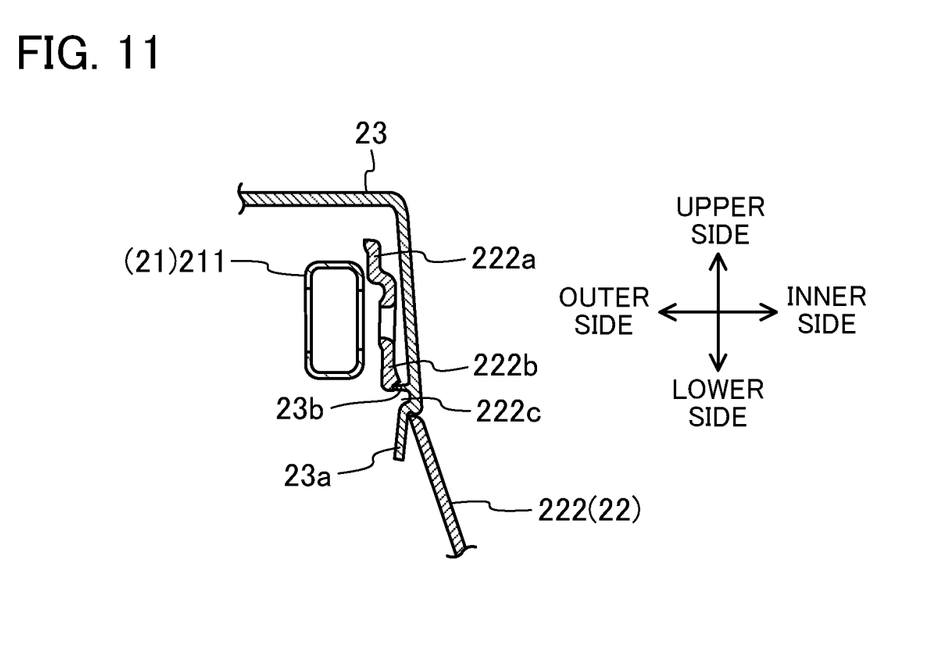
FIG. 11 is a sectional view along a Z-Z line of FIG. 4.

FIG. 9 is a sectional view along an X-X line of FIG. 7. FIG. 10 is a sectional view along a Y-Y line of FIG. 7. FIG. 11 is a sectional view along a Z-Z line of FIG. 4.

In this example, the first door panel 22 and the second door panel 33 are connected to each other with rivets 52. More specifically, the first door panel 22 and the second door panel 33 are, with the rivets 52, connected to each other at two locations at both end portions in the front-rear direction, as shown in FIG. 7. That is, as shown in FIG. 9, an upper end portion 222*a* of the first inner panel 222 and a lower end portion 332*a* of the second inner panel 332 overlap with each other in the vehicle width direction. In this example, the lower end portion 332a of the second inner panel 332 is positioned on the inner side in the vehicle width direction. The upper end portion 222a and the lower end portion 332a overlapping with each other are connected to each other with the rivets 52.

Note that holes 52a for avoiding contact with the rivets 52 are formed at the frame body 311. Although not shown in the figure, an upper end portion of the first outer panel 221 and a lower end portion of the second outer panel 331 are also similarly connected to each other with rivets 52.

Such a connection method using the rivets 52 is also similarly applied to connection between the first door panel 22 and the cover 23 at the half door 2A. Specifically, as shown in FIG. 4, the first door panel 22 and the cover 23 are, with the rivets 52, connected to each other at two locations at both end portions in the front-rear direction. That is, although not shown in the figure, an upper end portion of the first inner panel 222 and a lower end portion of the cover 23 are connected to each other with the rivets 52, and the upper end portion of the first outer panel 221 and the lower end portion of the cover 23 are connected to each other with the rivets 52.

The first door panel 22 and the second door panel 33 are connected to each other by a method different from riveting at a portion other than both end portions in the front-rear direction. For example, as shown in FIG. 10, the first inner panel 222 and the second inner panel 332 are connected to each other with a grommet 53. Specifically, the grommet 53 opening in the vehicle width direction is attached to the upper end portion 222a of the first inner panel 222. At the lower end portion 332a of the second inner panel 332, a fitting portion 332b protruding to the outer side in the vehicle width direction is formed. The fitting portion 332b is fitted in the grommet 53, and accordingly, the first inner panel 222 and the second inner panel 332 are connected to each other.

For example, the first door panel 22 and the cover 23 are connected to each other by a method different from riveting at a portion other than both end portions in the front-rear direction. For example, as shown in FIG. 11, the first door panel 22 and the cover 23 have a pair of locking portions that lock each other.

Specifically, an opening 222c is formed at the upper end portion 222a of the first inner panel 222, and a locking portion 222b is provided at the opening 222c. The locking portion 222b is a piece-shaped member extending in the up-down direction. An upper end of the locking portion 222b is fixed, and a lower end of the locking portion 222b is a free end. The locking portion 222b is formed such that a lower end portion thereof is bendable in the vehicle width direction. A lower end portion 23a of the cover 23 is positioned on the inner side in the vehicle width direction with respect to the locking portion 222b. At the lower end portion 23a of the cover 23, a locking portion 23b that locks the locking portion 222b of the first inner panel 222 is provided. The locking portion 23b protrudes to the outer side in the vehicle width direction.

When the first door panel 22 and the cover 23 are connected to each other, the locking portion 23b of the cover 23 pushes the locking portion 222b of the first inner panel 222 to the outer side in the vehicle width direction while moving downward. Meanwhile, the lower end portion 23a of the cover 23 enters the opening 222c of the first inner panel 222. The lower end portion of the locking portion 222b is pushed by the locking portion 23b, and accordingly, is bent to the outer side in the vehicle width direction. Subsequently, after the locking portion 23b has passed by the lower end of the locking portion 222b, the lower end portion of the locking portion 222b returns to the inner side in the vehicle width direction by restoring force of the locking portion 222b itself.

Accordingly, the locking portion 222b and the locking portion 23b lock each other, and the lower end portion 23a of the cover 23 is in a state in which the lower end portion 23a has entered the opening 222c of the first inner panel 222. In this manner, the first inner panel 222 and the cover 23 are connected to each other. Note that the first outer panel 221 and the cover 23 are also similarly connected to each other. The grommet 53 and the locking portions 222b, 23b as described above are not visible from the outside, and therefore, the appearance is improved.

As described above, each of the half door 2A and the full door 2B forming the door group 2 includes the outer knob 241, the inner knob 242, the door handle 26, the latch 27, and the hinges 28 provided at the first door panel 22.

In this configuration, the outer knob 241, the inner knob 242, the door handle 26, the latch 27, and the hinges 28 are concentrated on the same first door panel 22. Thus, the common first door panel 22 can be used between the half door 2A and the full door 2B, and the door components, such as the outer knob 241, concentrated on the first door panel 22 can also be used as common door components. With this configuration, the common door components can be used across a wide range.

With use of the common first door panel 22, a mold cost for the first door panel 22, i.e., the first outer panel 221 and the first inner panel 222, can be reduced. Moreover, since the common first door panel 22, the common outer knob 241, etc. are used, the number of components can also be reduced.

The operation switch 37 included only in the full door 2B is not provided at the first door panel 22, but the second door panel 33. Thus, while components required as the door components are provided, the common first door panel 22 can be used.

The window regulator 36 included only in the full door 2B is attached to the frame 31 in the first door panel 22. Thus, e.g., the shape of the first door panel 22 does not need to be changed for providing the window regulator 36. Thus, while the components required as the door components are provided, the common first door panel 22 can be used.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described in the above-described embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, at the half door 2A, at least one of the outer knob 241 or the door handle 26 may be omitted.

At the half door 2A, the frame 21 may be omitted.

At the full door 2B, the waterproof seal 38 may be omitted.

The positions of the outer knob 241, the inner knob 242, the door handle 26, the latch 27, and the hinges 28 at the first door panel 22 are not limited to the above-described positions.

Connection between the first door panel 22 and the cover 23 at the half door 2A and connection between the first door panel 22 and the second door panel 33 at the full door 2B are not limited to the connection forms described above in the embodiment. That is, a combination of plural types of connection forms such as riveting as described above in the embodiment other than the combination described above in the embodiment may be selected. One of the plural types of connection forms may be selected and employed in a unified manner.

The technique disclosed herein is also applicable to a full door 2B including a manual window as a window 34. In this case, at a second door panel 33 of the full door 2B, a manual window handle is provided instead of an operation switch 37. At a window regulator 36, an actuator 363 is omitted. That is, an occupant operates the manual window handle to move a carrier plate 362, and accordingly, the manual window moves up and down.

The technique disclosed herein is also applicable to a form in which hinges 28 are provided on the rear side of a door body.

The technique disclosed herein may be applied to a vehicle other than the utility vehicle 100.

What is claimed:

1. A vehicle half door comprising:
a door body having a first door panel;
a cover that closes an upper opening of the first door panel;
a door knob and a latch at the first door panel; and
a hinge at the first door panel to turnably support the door body,
wherein:
the first door panel includes a first inner panel and a first outer panel, and
an upper end portion of the first inner panel and a lower end portion of the cover are connected to each other with rivets, and an upper end portion of the first outer panel and the lower end portion of the cover are connected to each other with rivets.

2. A vehicle full door comprising:
a door body having a frame, a first door panel attached to the frame, and a second door panel formed separately from the first door panel and attached to the frame with connected to an upper end of the first door panel;
a window at the second door panel so as to move up and down;
a door knob and a latch at the first door panel; and
a hinge at the first door panel to turnably support the door body,
wherein:
the first door panel includes a first inner panel,
the second door panel includes a second inner panel,
the first door panel and the second door panel are, with rivets, connected to each other at two locations at both end portions in a front-rear direction, and
an upper end portion of the first inner panel and a lower end portion of the second inner panel overlap with each other in a vehicle width direction.

3. The vehicle full door of claim 2, further comprising:
a driver attached to the frame in the first door panel to move the window up and down.

4. The vehicle full door of claim 3, further comprising:
an operation switch at the second door panel to drive the driver.

5. A vehicle door group comprising:
a vehicle full door that opens or closes an entirety of an entrance of a vehicle; and
a vehicle half door that opens or closes part of the entrance of the vehicle,
wherein the vehicle half door includes:
a door body having a first door panel,
a cover that closes an upper opening of the first door panel,
a door knob and a latch at the first door panel, and
a hinge at the first door panel to turnably support the door body,
wherein:
the first door panel includes a first inner panel and a first outer panel, and
an upper end portion of the first inner panel and a lower end portion of the cover are connected to each other with rivets, and an upper end portion of the first outer panel and the lower end portion of the cover are connected to each other with rivets.

6. A vehicle door group comprising:
a vehicle full door that opens or closes an entirety of an entrance of a vehicle; and
a vehicle half door that opens or closes part of the entrance of the vehicle,
wherein the vehicle full door includes:
a door body having a frame, a first door panel attached to the frame, and a second door panel formed separately from the first door panel and attached to the frame with connected to an upper end of the first door panel,
a window at the second door panel so as to move up and down,
a door knob and a latch at the first door panel, and
a hinge at the first door panel to turnably support the door body,
wherein:
the first door panel includes a first inner panel,
the second door panel includes a second inner panel,
the first door panel and the second door panel are, with rivets, connected to each other at two locations at both end portions in a front-rear direction, and
an upper end portion of the first inner panel and a lower end portion of the second inner panel overlap with each other in a vehicle width direction.

7. The vehicle door group of claim 6, wherein:
the vehicle full door further includes a driver attached to the frame in the first door panel to move the window up and down.

8. The vehicle door group of claim 7, wherein:
the vehicle full door further includes an operation switch at the second door panel to drive the driver.

9. A vehicle door group comprising:
a vehicle full door that opens or closes an entirety of an entrance of a vehicle; and
a vehicle half door that opens or closes part of the entrance of the vehicle,
wherein each of the vehicle full door and the vehicle half door includes:
a door body having a first door panel,
a door knob and a latch at the first door panel, and
a hinge at the first door panel to turnably support the door body,
wherein:

the vehicle half door includes a cover that closes an upper opening of the first door panel, the first door panel of the vehicle half door includes a first inner panel and a first outer panel, and an upper end portion of the first inner panel and a lower end portion of the cover are connected to each other with rivets, and an upper end portion of the first outer panel and a lower end portion of the cover are connected to each other with rivets.

10. The vehicle door group of claim 9, wherein each of the vehicle full door and the vehicle half door further includes a door handle at the first door panel.

\* \* \* \* \*